(12) United States Patent
Cheng

(10) Patent No.: US 8,532,214 B2
(45) Date of Patent: Sep. 10, 2013

(54) MIMO CHANNEL STATE INFORMATION ESTIMATION WITH COUPLED ITERATIVE TWO-STAGE RANKING

(75) Inventor: Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 397 days.

(21) Appl. No.: 12/828,548

(22) Filed: Jul. 1, 2010

(65) Prior Publication Data

US 2012/0002742 A1    Jan. 5, 2012

(51) Int. Cl.
    *H04B 7/02*    (2006.01)
(52) U.S. Cl.
    USPC ........... 375/267; 375/260; 375/262; 375/295; 375/299; 375/316
(58) Field of Classification Search
    USPC .............. 375/259, 260, 261, 262, 267, 278, 375/295, 299, 302, 316, 340, 346
    See application file for complete search history.

(56) References Cited

U.S. PATENT DOCUMENTS

| 2008/0292013 A1* | 11/2008 | Varadarajan et al. | 375/260 |
|---|---|---|---|
| 2008/0298264 A1* | 12/2008 | Ramesh et al. | 370/252 |
| 2008/0304590 A1* | 12/2008 | Sundberg et al. | 375/260 |
| 2009/0124210 A1* | 5/2009 | Imai et al. | 455/69 |
| 2010/0008431 A1* | 1/2010 | Wu et al. | 375/244 |
| 2010/0074358 A1* | 3/2010 | Khojastepour et al. | 375/267 |
| 2011/0128917 A1* | 6/2011 | Ko et al. | 370/328 |
| 2011/0216846 A1* | 9/2011 | Lee et al. | 375/295 |
| 2011/0222411 A1* | 9/2011 | Koskinen et al. | 370/241 |
| 2011/0286349 A1* | 11/2011 | Tee et al. | 370/252 |

FOREIGN PATENT DOCUMENTS

WO    WO 2005/064870 A2    7/2005

OTHER PUBLICATIONS

Oiao e al.: "Research on an iterative algorithm of LS channel estimation in MIMO OFDM systems", Emerging Technologies: Frontiers of Mobile and Wireless Communication, 2004. Proceedings of the IEEE 6th Circuits and Systems Symposium, Piscataway, NJ, USA, IEEE, vol. 2, May 31, 2004, pp. 729-732, XP010716158, DOI: 10. 1109/CASSET.2004. 1321991 ISBN: 978-0-7803-7938-1.
3GPP TS 36.211 V8.6.0 (Mar. 2009) 3rd Generation Partnership Project; Technical Specification Group Radio Access Network; Evolved Universal Terrestrial Radio Access (E-UTRA); Physical Channels and Modulation (Release 8), the whole document.
3GPP TS 36.212 V8.6.0 (Mar. 2009) $3^{rd}$ Generation Partnership Project; Technical Specification Group Radio Access Network; Evolved Universal Terrestrial Radio Access (E-UTRA); Multiplexing and channel coding (Release 8), the whole document.
3GPP TS 36.213 V8.6.0 (Mar. 2009) $3^{rd}$ Generation Partnership Project; Technical Specification Group Radio Access Network; Evolved Universal Terrestrial Radio Access (E-UTRA); Physical layer procedures (Release 8), the whole document.
Baraniuk R. G. et al. "Compressive Sampling", IEEE Signal Processing Magazine, Mar. 2008, pp. 12-13.
Candès, E. J. et al. "An Introduction To Compressive Sampling", IEEE Signal Processing Magazine, Mar. 2008, pp. 21-30.

* cited by examiner

Primary Examiner — Hirdepal Singh

(57) ABSTRACT

A plurality of wireless channels link a transmitter and a receiver, each channel corresponding to a different transmit-receive antenna pair. Channel state information is estimated for the plurality of wireless channels by grouping the plurality of channels into one or more groups, each group including the channels associated with two or more collocated transmit and/or receive antennas. A set of delay tap values is iteratively estimated in the time domain for each group of channels so that the channels included in the same group are associated with the same delay tap values. A frequency domain channel response of each of the channels included in the same group of channels is estimated based on the set of delay tap values estimated for the group.

12 Claims, 3 Drawing Sheets

MIMO CHANNEL STATE INFORMATION ESTIMATION WITH COUPLED ITERATIVE TWO-STAGE RANKING

TECHNICAL FIELD

The present invention relates generally to wireless communications, and particularly to an efficient system and method of estimating, at a wireless receiver, multiple-input and/or multiple-output (MIMO) channel state information (CSI) from sparse data transmitted by a wireless transmitter.

BACKGROUND

Wireless communication networks transmit communication signals in the downlink over radio frequency channels from fixed transceivers, known as base stations, to mobile user equipment (UE) within a geographic area normally referred to as a cell. Similarly, the UE can transmit signals in the uplink to one or more of the base stations. In both cases, the received signal may be characterized as the transmitted signal, altered by channel effects, plus noise and interference.

To recover the transmitted signal from a received signal, a receiver must estimate both the channel and the noise/interference. The characterization of a channel is typically referred to as channel state information (CSI). One known way to estimate a channel is to periodically transmit known reference symbols, commonly referred to as pilot symbols. Since the reference symbols are known by the receiver, any deviation in the received symbols from the reference symbols (after the estimated noise/interference is removed) is caused by channel effects. An accurate estimate of CSI allows a receiver to more accurately recover transmitted signals from received signals.

In addition, by transmitting CSI from the receiver to a transmitter, the transmitter can select the transmission characteristics such as coding, modulation, and the like best suited for the current channel state. This is widely known as channel-dependent link adaptation. For example, UEs in a wireless communication network can transmit succinct, direct channel state information to the network without substantially increasing uplink overhead. The UE receives and processes reference symbols over a set of non-uniformly spaced sub-carriers, selected according to a scheme synchronized to the network. In another example, the network computes accurate channel estimates based on infrequently transmitted CSI feedback data from a UE. Both of these techniques typically involve two steps. A time domain tap delay channel model is first constructed from the inverse quantized CSI feedback samples. The time domain tap delay channel model is then frequency-transformed to obtain frequency response estimates of the downlink communication channel. These techniques effectively estimate the CSI between a pair of transmitting and receiving antennas. In a system with multiple input and multiple output (MIMO) antennas, these estimation techniques are applied multiply and independently for each of the transmit/receive antenna pairs.

However, the approaches mentioned above are suboptimal for MIMO-based systems because the physical specifics of the MIMO setup are not used in the estimation process either to reach the best accuracy or to reduce the amount of feedback samples. In addition, the CSI estimation techniques mentioned above are computationally complex. For example, a very effective technique for estimating the time domain tap delay model is based on convex optimization, which incurs high computational complexity, particularly for MIMO-based systems due to the multitude of transmit/receive antenna pairs.

SUMMARY

According to the system and method embodiments disclosed herein, a wireless receiver estimates multiple-input and/or multiple-output (MIMO) channel state information (CSI) from sparse data transmitted by a wireless transmitter. Accurate MIMO CSI can be obtained from e.g. sparse CSI reference symbols (CSI-RS) transmitted in accordance with Release 10 of the Long Term Evolution (Rel/10 LTE) wireless communication system. In another embodiment, accurate MIMO CSI models are computed from sparsely sampled feedback information generated as disclosed in U.S. Provisional Patent Application Ser. No. 61/172,484, filed Apr. 24, 2009, titled "Channel State Information Feedback by Digital Loopback", the content of which is incorporated herein by reference in its entirety. In each case, accurate CSI is obtained from as few reference symbols or feedback samples as possible in order to reduce overhead on resource utilization. The embodiments disclosed herein are also applicable to a wider range of setups that require channel state information estimation.

Some embodiments described herein impose knowledge of the time domain tap delay channel model structure across multiple input/output antenna pairs to improve estimation accuracy and/or reduce the number of required reference symbols or feedback samples. In one embodiment, identical tap delay positions are enforced for all antenna pairs that share close spatial vicinity.

Some embodiments disclosed herein implement iterative ranking and simple least square estimation instead of convex optimization. A first ranking function imposes the channel structure knowledge and a second ranking function directs the iterative algorithm toward the sparse solutions from the corresponding convex optimization. A goodness of fit function controls the structural quality for different application scenarios. Parameters in the ranking and goodness of fit functions allow the same iterative algorithm to be deployed in systems with different interference characteristics, different types of estimation quality requirements and different levels of MIMO model uncertainty. The complexity of the algorithm can be reduced by employing simple least square estimation sub-steps and is further controllable by appropriately setting the maximum number of iterations and the amount of least goodness improvement. High estimation quality is provided with a computation complexity reduction factor of more than ten.

According to an embodiment of a method of estimating channel state information for a plurality of wireless channels linking a transmitter and a receiver, each channel corresponding to a different transmit-receive antenna pair, the method includes grouping the plurality of channels into one or more groups. Each group includes the channels associated with two or more collocated transmit and/or receive antennas. The method further includes iteratively estimating a set of delay tap values in the time domain for each group of channels so that the channels included in the same group are associated with the same delay tap values and estimating a frequency domain channel response of each of the channels included in the same group of channels based on the set of delay tap values estimated for the group.

According to an embodiment of a receiver linked to a transmitter via a plurality of wireless channels, each channel corresponding to a different transmit-receive antenna pair, the receiver includes one or more receive antennas and a CSI estimator. The CSI estimator is operable to group the plurality of channels into one or more groups, each group including the channels associated with two or more collocated transmit and/or receive antennas. The CSI estimator is further operable to iteratively estimate a set of delay tap values in the time domain for each group of channels so that the channels included in the same group are associated with the same delay tap values and estimate a frequency domain channel response of each of the channels included in the same group of channels based on the set of delay tap values estimated for the group.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
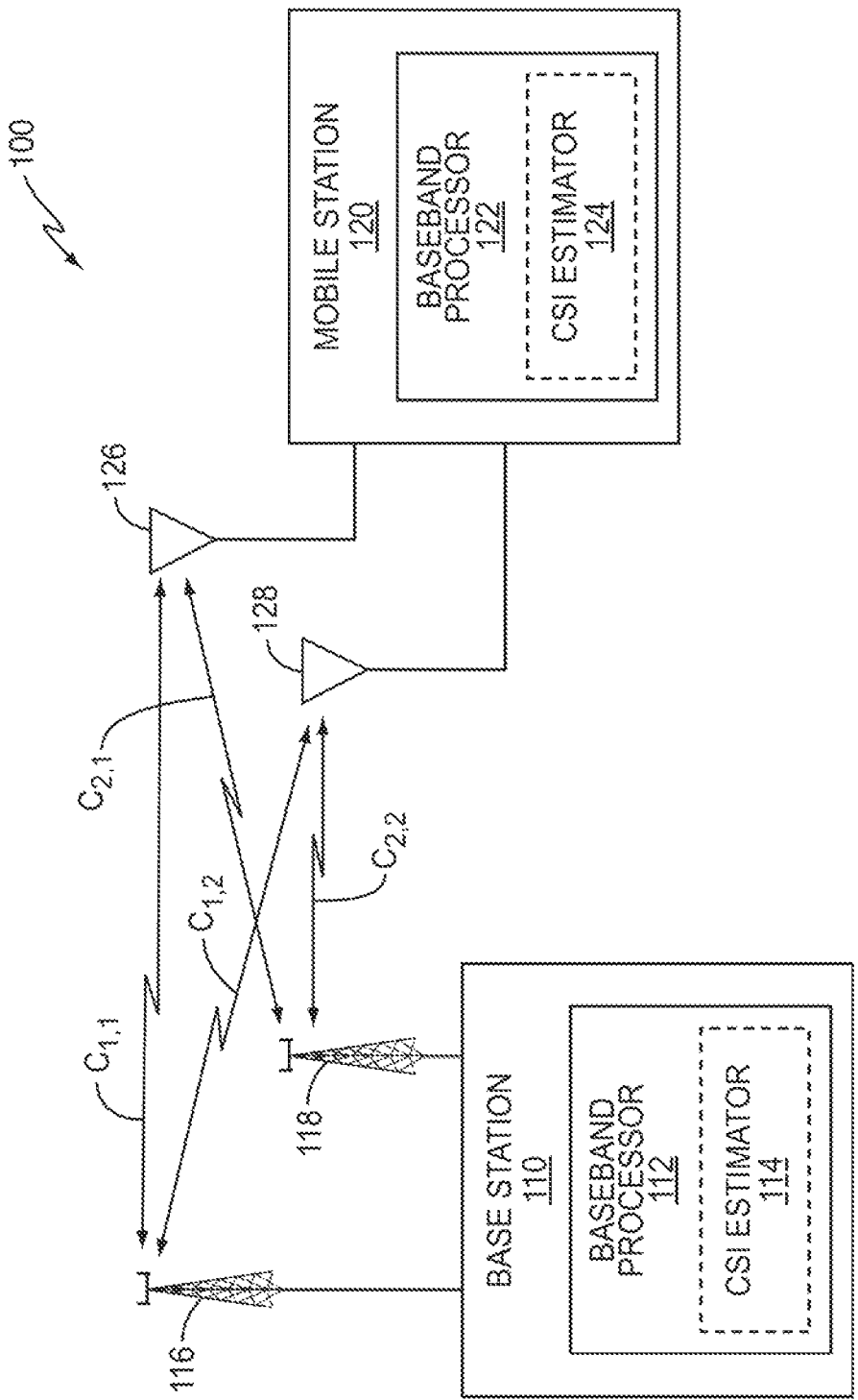
FIG. 1 illustrates an embodiment of a wireless communication network including a base station serving a mobile station.

FIG. 1 illustrates an embodiment of a wireless communication network 100 including a base station 110 serving a mobile station 120 such as a UE. The base station 110 transmits communication signals in the downlink over radio frequency channels to the mobile station 120. The mobile station 120 can transmit signals in the uplink to the base station 110. In both cases, the received signal may be characterized as the transmitted signal, altered by channel effects, plus noise and interference. At least one of the base station 110 and/or the mobile station 120 has more than one antenna. In the downlink direction, the mobile station 120 is the wireless receiver and the base station 110 is the wireless transmitter. The opposite holds true in the uplink direction, i.e. the base station 110 is the receiver and the mobile station 120 is the transmitter. Thus, the term 'receiver' as used herein can mean either the base station 110 or the mobile station 120 depending on the communication link direction.

The wireless receiver estimates multiple-input and/or multiple-output (MIMO) channel state information (CSI) from sparse data transmitted by the wireless transmitter. To this end, both the base station 110 and the mobile station 120 have a baseband processor 112, 122. A CSI estimator 114, 124 included in or associated with the corresponding baseband processor 112, 122 estimates the MIMO CSI from sparse data transmitted by the transmitter. Each CSI estimator 114, 124 can be implemented in hardware, firmware, software, or various combinations thereof. The receiver CSI estimator 114/124 groups the MIMO channels into one or more groups of multiple link channels, each group including the channels associated with two or more collocated transmit and/or receive antennas i.e. two or more transmit or receive antennas in close spatial proximity, e.g. as illustrated by Step 200 of FIG. 2. All of the mobile station antennas can be considered collocated. In a purely illustrative example, FIG. 1 shows the base station 110 having two antennas 116, 118 and the mobile station 120 also having two antennas 126, 128. As such, there are four channels. Channel C1,1 is between the first antenna 116 of the base station 110 and the first antenna 126 of the mobile station 120. Channel C1,2 is between the first antenna 116 of the base station 110 and the second antenna 128 of the mobile station 120. Channel C2,1 is between the second antenna 118 of the base station 110 and the first antenna 126 of the mobile station 120. Channel C2,2 is between the second antenna 118 of the base station 110 and the second antenna 128 of the mobile station 120. In general, the base station 110 may have fewer or more antennas and so too can the mobile station 120.

The antennas associated with a particular group of MIMO channels are collocated in that two or more transmit antennas are physically located closely and/or two or more receive antennas are physically located closely. For instance, the antennas 126, 128 of the mobile station 120 or some or all of the transmit antennas 116, 118 of the base station 110 can be located in close proximity. The multiple link channels associated with the collocated antennas are thus affected by a similar set of multipath reflectors. The time domain tap delay channel models for such multiple link channels can be hypothesized by the receiver CSU estimator 114/124 to share the same tap delay positions. The receiver CSI estimator 114/124 uses this physical feature to enhance channel estimation accuracy. For instance, if the base station 110 has four collocated transmit antennas and the mobile station 120 has two receive antennas, then the 4×2 MIMO channels are treated together as a group of $P_{max}=8$ links by the receiver CSI estimator 114/124 in the algorithms described herein. If, on the other hand, the four base station antennas include two antennas each at two different locations, then two groups of $P_{max}=4$ links are treated separately by the receiver CSI estimator 114/124 in the algorithms described herein.

Each group of multiple link channels has $P_{max}$ links, where $P_{max}$ can vary from group to group in cases where more than one group of MIMO channels is determined. Each link channel is sampled at $S_{max}$ sub-carriers. Each of the link channels can be sampled with different subcarrier sets. Let $\{f_{p,s}\}$, where $p=0, \ldots, P_{max}-1$ and $s=0, \ldots, S_{max}-1$, be the set of sampled subcarrier indices for the multiple link channels. For the pth link channel, where $p=0, \ldots, P_{max}-1$, the receiver CSI estimator 114/124 collects the feedback frequency domain samples available at the receiver into a $S_{max} \times 1$ vector as given by:

$$H_p = \begin{bmatrix} H_p(0) \\ H_p(1) \\ \vdots \\ H_p(S_{max}-1) \end{bmatrix} \quad (1)$$

The matrix $H_p$ represents the frequency domain channel response determined by the receiver CSI estimator 114/124 for the pth link channel in the group. For example, with respect to FIG. 1, $P_{max}=4$ and $H_1$ corresponds to link channel C1,1, $H_2$ corresponds to link channel C1,2, $H_3$ corresponds to link channel C2,1, and $H_4$ corresponds to link channel C2,2 if both base station antennas 116, 118 are collocated and both mobile station antennas 126, 128 are also collocated. The feedback samples may contain, among other impairments, channel estimation errors and quantization/dequantization errors.

Figure 2:
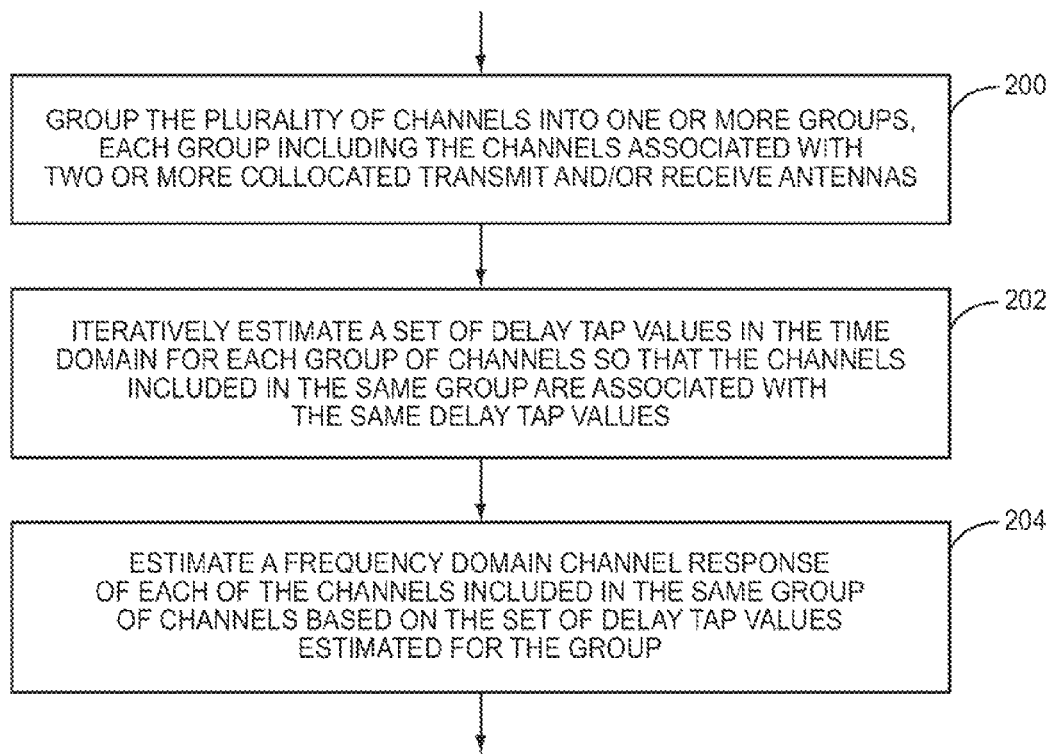
FIG. 2 illustrates an embodiment of a method for iteratively estimating channel state information for a plurality of wireless channels linking a transmitter and a receiver.

For the pth link channel of the same group, where $p=0, \ldots, P_{max}-1$, the receiver CSI estimator $P_{max}=4$ iteratively estimates the time domain tap delay channel model across several link channels jointly as an $L_{max} \times 1$ tap delay vector as given by:

$$\hat{h}_p = \begin{bmatrix} \hat{h}_p(0) \\ \hat{h}_p(1) \\ \vdots \\ \hat{h}_p(L_{max}-1) \end{bmatrix} \quad (2)$$

so that the link channels included in the same group are associated with the same delay tap values, e.g. as illustrated by Step 202 of FIG. 2. The receiver CSI estimator $P_{max}=4$ determines the maximum span of the tap delays $L_{max}$ by, among other factors, the signal bandwidth and cyclic prefix length of the OFDM signal e.g. as defined in the LTE standards. The tap delay vector $L_{max}$ can be in the order of tens or hundreds of ns, with only a few taps being meaningfully nonzero. Such tap delay vectors are known as sparse vectors.

The receiver CSI estimator 114/124 estimates a frequency domain channel response of each of the link channels included in the same group of channels based on the set of delay tap values estimated for the group, e.g. as illustrated by Step 204 of FIG. 2. In one embodiment, the receiver CSI estimator 114/124 sets $W_p$ as an $S_{max} \times L_{max}$ sub-matrix of the N-point FFT matrix with elements given by:

$$W_p(s,l) = e^{-j2\pi f_{p,s}l/N} \quad (3)$$

e.g. where N can be the FFT size of the OFDM signal as defined in the LTE system specifications.

The estimation algorithm implemented by the receiver CSI estimator 114/124 determines a set of $T_{max}$ active taps $\Gamma = \{l_t\}$, where $t = 0, \ldots, T_{max}-1$ and $T_{max} \ll L_{max}$. The estimation algorithm also determines the $P_{max} \times T_{max}$ taps values for $\{\hat{h}_p(l)\}$, where $p = 0, \ldots, P_{max}-1$ and $l \in \Gamma$, such that $W_p \hat{h}_p$ is consistent with $H_p$ for all $p = 0, \ldots, P_{max}-1$. For the taps not in the active set, the tap value can be estimated to be zero i.e. $\hat{h}_p(l) = 0$ for all $l \notin \Gamma$.

With the estimated time domain model, the receiver CSI estimator 114/124 can determine the frequency domain channel responses across the entire OFDM signal bandwidth by performing a Fourier transform. To reduce computation complexity, an exemplary embodiment based on iteratively applying ranking and simple least square estimation is described next and illustrated in FIG. 3.

Figure 3:
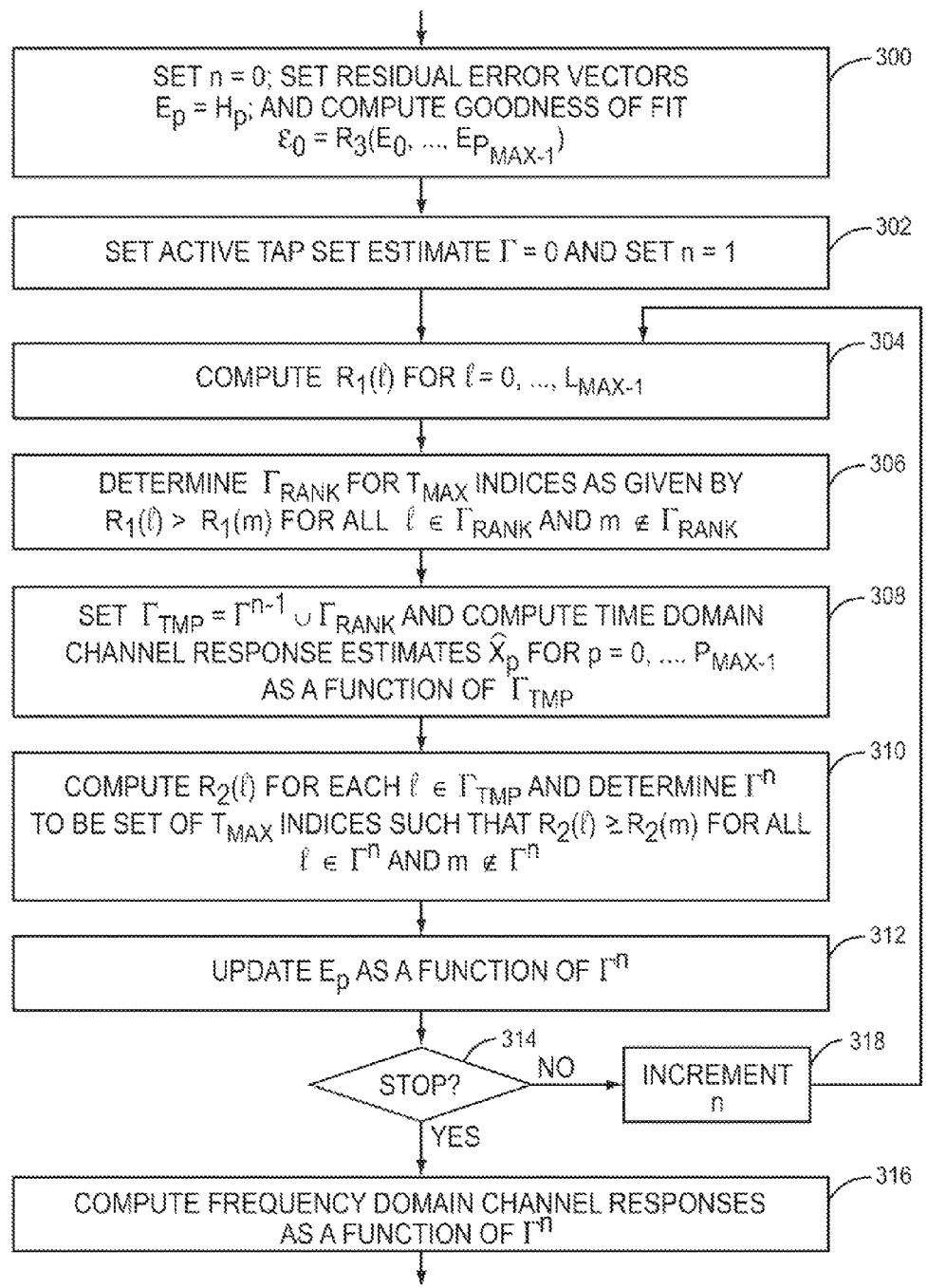
FIG. 3 illustrates another embodiment of a method for iteratively estimating channel state information for a plurality of wireless channels linking a transmitter and a receiver.

According to the embodiment shown in FIG. 3, the receiver CSI estimator 114/124 first performs an initialization procedure that includes setting the $0^{th}$ residual error vectors to $E_p = H_p$ for $p = 0, \ldots, P_{max}-1$ and computing a goodness of fit measure $\epsilon^0 = R_3(E_0, \ldots, E_{P_{max}-1})$ (Step 300). The goodness of fit function $R_3$ allows customizable quality control of the estimation for different applications and scenarios. Embodiments for determining $R_3$ are described later herein. The $0^{th}$ active tap estimate is also set to be an empty set $\Gamma^0 = \emptyset$ and the iteration number n is set to 1 during the initialization procedure (Step 302).

For the nth iteration of the estimation process, the value of a first ranking function $R_1(l)$ is computed for each $l = 0, \ldots, L_{max}-1$ (Step 304). The first ranking function $R_1(l)$ is designed to impose the channel structure knowledge by examining the un-modeled channel response and giving a value to each channel tap across multiple link channels. Embodiments for determining $R_1(l)$ are described later herein.

Ranking $\Gamma_{rank}$ is then determined to be the set of $T_{max}$ indices such that $R_1(l)$ are the largest (Step 306). That is, $R_1(l) \geq R_1(m)$ for all $l \in \Gamma_{rank}$ and $m \notin \Gamma_{rank}$. The receiver CSI estimator 114/124 then sets $\Gamma_{tmp}$ as the union set of $\Gamma^{n-1}$ and $\Gamma_{rank}$, lets $T_{tmp}$ be the size of the set $\Gamma_{tmp}$ and performs a least square channel estimation based on $\Gamma_{tmp}$ as the correct active tap positions for $p = P_{max}-1$ (Step 308). The set $\Gamma^{n-1}$ contains the hypothesized channel taps determined during the previous iteration, $\Gamma_{rank}$ contains the newly hypothesized channel taps determined during the current iteration and $\Gamma_{tmp}$ contains the hypothesized channel taps used to determine the time domain channel estimate for the current iteration. In one embodiment, $\hat{x}_p$ is the $T_{tmp} \times 1$ nonzero values of $\hat{h}_p$ which are given by:

$$\hat{x}_p = (W_{p,\Gamma_{tmp}}^H W_{p,\Gamma_{tmp}})^{-1} W_{p,\Gamma_{tmp}}^H H_p \quad (4)$$

where $W_{p,\Gamma_{tmp}}$ is the $S_{max} \times T_{tmp}$ sub-matrix of $W_p$ by taking the $T_{tmp}$ columns indexed by the set $\Gamma_{tmp}$. The channel response estimate $\hat{x}_p$ is therefore determined based on the hypothesized channel taps included in $\Gamma_{tmp}$ according to this embodiment. Accordingly, each of the hypothesized channel taps is used to estimate the least-squares fit of the channel in the time domain. For numerical or other implementation reasons, the least square estimates can be computed with different algorithms as described later herein.

For each $l \in \Gamma_{tmp}$, the receiver CSI estimator 114/124 computes the value of a second ranking function $R_2(l)$ and determines $\Gamma^n$ to be the set of $T_{max}$ indices such that $R_2(l)$ are the largest (Step 310). That is, $R_2(l) \geq R_2(m)$ for all $l \in \Gamma^n$ and $m \notin \Gamma^n$. The second ranking function $R_2(l)$ is designed to direct the iterative algorithm to converge toward the sparse solutions from the corresponding high-complexity convex optimization approach. The set $\Gamma^n$ thus includes the channel taps with the largest values as determined based on the second ranking function $R_2(l)$. Embodiments for determining $R_2(l)$ are described later herein. The receiver CSI estimator 114/124 then updates the residual error vectors for $p = 0, \ldots, P_{max}-1$ (Step 312). In one embodiment, the residual error vectors are updated as given by:

$$E_p = H_p - W_{p,\Gamma^n}(W_{p,\Gamma^n}^H W_{p,\Gamma^n})^{-1} W_{p,\Gamma^n}^H H_p \quad (5)$$

where $W_{p,\Gamma^n}$ is the $S_{max} \times T_{max}$ sub-matrix of $W_p$ by taking the $T_{max}$ columns indexed by the set $\Gamma^n$. Equation (5) represents a least squares frequency domain channel estimation algorithm for determining the new frequency domain residual errors as a function of the frequency domain channel response estimate $H_p$ which is determined by the receiver CSI estimator 114/124 based on the channel taps in $\Gamma^n$.

With the updated frequency domain residual errors, the receiver CSI estimator 114/124 determines whether to stop or continue the iterative estimation process (Step 314). Various stopping criteria can be used to make this determination. In one embodiment, the receiver CSI estimator 114/124 computes the overall residual error as given by:

$$\epsilon^n = R_3(E_0, \ldots, E_{P_{max}-1}) \quad (6)$$

If $\epsilon^n \geq \epsilon^{n-1} - \epsilon_{min}$ i.e. the overall residual error is not lowered by more than $\epsilon_{min}$, then the receiver CSI estimator 114/124 sets $\Gamma^n = \Gamma^{n-1}$, stops the iterative estimation process and computes the final frequency domain channel response estimate as a function of the new $\Gamma^n$ (Step 316). Otherwise, n is incremented by 1 (Step 318) and the iterative estimation process is repeated (Steps 304 to 314). In another embodiment, the receiver CSI estimator 114/124 stops the iterative estimation process and computes the final frequency domain channel response estimate as a function of $\Gamma^n$ (Step 316) if n is greater than a maximum number of allowed iterations. Otherwise, n is incremented by 1 (Step 318) and the iterative estimation process is repeated (Steps 304 to 314). In yet another embodiment, the receiver CSI estimator 114/124 stops the iterative estimation process and computes the final frequency domain channel response estimate as a function of $\Gamma^n$ (Step 316) if $\epsilon^n$ of equation (6) is less than or equal to a predetermined value $\epsilon_{min}$. Otherwise, n is incremented by 1 (Step 318) and the iterative estimation process is repeated (Steps 304 to 314). In floating-point tests for various MIMO channel scenarios with $\epsilon_{min}=0$, the number of iterations is generally about 3 and usually not more than 5. Therefore, the maximum number of allowed iterations can be set relatively low.

The final frequency domain channel response estimate is computed upon completion of the iterative estimation process (Step 316). According to an embodiment, the frequency domain channel response estimate is computed across the entire OFDM signal bandwidth at the end of the iterative process for p=0, . . . , $P_{max}-1$ as given by:

$$\hat{H}_p = W_{\Gamma^n}(W_{p,\Gamma^n}^H W_{p,\Gamma^n})^{-1} W_{p,\Gamma^n}^H H_p \quad (7)$$

where $\hat{H}_p$ is a N×1 vector and $W_{\Gamma^n}$ is a N×$T_{max}$ sub-matrix of the N-point FFT matrix by taking the $T_{max}$ columns indexed by the set $\Gamma^n$. N is the FFT size of the OFDM signal e.g. as defined in the LTE system specifications.

Returning to the iterative estimation process, the receiver CSI estimator 114/124 computes the first ranking function $R_1(l)$ to measure the correlation between the frequency domain response of the lth delay tap and the current residual error vectors, $\{E_p\}_{p=0}^{P_{max}-1}$, at different sampled sub-carrier sets for different link channels. The residual error corresponds to the frequency domain response not yet modeled, and therefore the receiver CSI estimator 114/124 attempts to identify the final channel taps that correspond to the un-modeled frequency domain response. The first ranking function $R_1(l)$ is also designed to impose the MIMO channel structure knowledge, providing a coupling mechanism between the different link channels in the same group.

In one embodiment, the receiver CSI estimator 114/124 computes the first ranking function $R_1(l)$ as given by:

$$R_1(l) = \sum_{p=0}^{P_{max}-1} \left| \sum_{s=0}^{S_{max}-1} e^{j2\pi f_{p,s} l/N} E_p(s) \right|^{q_1} \quad (8)$$

where $q_1$ is a positive constant that can be specified and fine tuned for the specific applications. In general, $q_1$ is between 1 and 2. For $q_1=2$, the first ranking function $R_1(l)$ couples the energy from different link channels to rank the relevance of different delay taps. This choice of $q_1$ is more consistent with conventional signal processing paradigms, but is more susceptible to unexpected frequency domain interference spikes. By setting $q_1$ closer to 1, such weakness to uneven frequency domain interference can be significantly reduced. The parameter $q_1$ thus allows the same estimation algorithm to be deployed in cases with even or uneven interferences in the frequency domain.

The receiver CSI estimator 114/124 computes the second ranking function $R_2(l)$ to direct the solution provided by the iterative algorithm to converge toward the sparse solutions from the corresponding high-complexity convex optimization approach. The second ranking function $R_2(l)$ also preferably keeps the coupling between different MIMO link channels. Toward these ends, the second ranking function $R_2(l)$ can be computed according to one embodiment as given by:

$$R_2(l) = \sum_{p=0}^{P_{max}-1} |\hat{x}_p(l)|^{q_2} \quad (9)$$

where $q_2$ is a positive constant that can be specified and fine tuned to deal with MIMO channel model uncertainty. Equation (9) examines each channel tap one-by-one and combines the energy from all link channels together for the tap under consideration. In one embodiment, $q_2=2$ for combining the tap energies from all MIMO links for the ranking. However, when estimating the downlink channel of a new LTE cell for the first time, there is model uncertainty regarding whether the multiple transmit antennas are in fact physically collocated. Hence, in such initial access cases, a lower $q_2$ can be tested with the iterative estimation algorithm to see if the identified tap delay position set is similar to that identified with the $q_2=2$ setting. If the two sets are substantially similar, the normal setting of $q_2$ can be safely adopted. Otherwise, the set of identified tap delay positions provides an indication on which sub-sets of the multiple transmit antennas are physically collocated. The estimation algorithm can then be applied to the reconstituted multiple MIMO link groups.

The receiver CSI estimator 114/124 computes the goodness of fit function $R_3$ to provide an overall measure on the multiple residual error vectors that are at different sampled sub-carrier sets for different MIMO antenna link channels. According to one embodiment, the goodness of fit function $R_3$ is computed as given by:

$$R_3(E_0, \ldots, E_{P_{max}-1}) = \sum_{p=0}^{P_{max}-1} \left[ \sum_{s=0}^{S_{max}-1} |E_p(s)|^{q_3} \right]^{\frac{q_2}{q_3}} \quad (10)$$

where $q_2$ is a positive tunable constant as defined for the second ranking function $R_2(l)$ and $q_3$ is a positive tunable constant to customized different estimation quality characteristics. In traditional signal processing, overall effects of residual errors are measured by the total energy in the error vectors. Following this tradition, the parameter $q_3$ can be set to 2. Note that, with this setting, error vectors with high residual errors in a few sub-carriers but low residual errors in other sub-carriers are allowed. That is, there is no absolute guarantee on the maximum residual error at any sub-carrier.

There are applications where the maximum residual error at any sub-carrier should be controlled. For such cases, $q_3$ can be set larger than 2 to obtain more uniform residual errors across the sub-carriers. In the extreme case of setting $q_3=\infty$, the goodness of fit function becomes:

$$R_3(E_0, \ldots, E_{P_{max}-1}) = \sum_{p=0}^{P_{max}-1} \left[ \max_{s=0,\ldots,S_{max}-1} |E_p(s)| \right]^{q_2} \quad (11)$$

Hence, the quality characteristics of the estimation output can be customized with different $q_3$ setting which can be utilized to compute the goodness of fit function with better coverage.

For numerical or other implementation reasons, the least square estimation in equations (4), (5) and (7) are not necessarily computed literally as the respective mathematical equations indicate. In particular, most efficient implementations utilize QR or SVD decomposition methods which are well known to those skilled in the art to avoid explicit matrix inversions. Furthermore, more general versions of the least square estimation algorithms can also be incorporated with the iterative framework described herein. For instance, regularization can be introduced to improve numerical stability of the channel response estimate as given by:

$$\hat{x}_p = (W_{p,\Gamma_{tmp}}^H W_{p,\Gamma_{tmp}} + \sigma^2 I)^{-1} W_{p,\Gamma_{tmp}}^H H_p \quad (12)$$

where $\sigma^2$ is a regularization parameter and I is a $T_{tmp} \times T_{tmp}$ identity matrix. With this regularized least square, the error vector update represented by equation (5) and the final estimation output represented by equation (7) become, respectively:

$$E_p = H_p - W_{p,\Gamma^n}(W_{p,\Gamma^n}^H W_{p,\Gamma^n} + \sigma^2 I)^{-1} W_{p,\Gamma^n}^H H_p$$

$$\hat{H}_p = W_{\Gamma^n}(W_{p,\Gamma^n}^H W_{p,\Gamma^n} + \sigma^2 I)^{-1} W_{p,\Gamma^n}^H H_p \quad (13)$$

In another embodiment, a weighted least square solution can be applied to the channel response estimate as given by:

$$\hat{x}_p = (W_{p,\Gamma_{tmp}}^H C_p W_{p,\Gamma_{tmp}} + \sigma^2 I)^{-1} W_{p,\Gamma_{tmp}}^H C_p H_p \quad (14)$$

where $C_p$ is a $S_{max} \times S_{max}$ diagonal matrix containing the weighting coefficients for the pth link channel. The weighting coefficients can be deployed to account for different interference characteristics at different frequency domain sub-carriers. With this weighted regularized least square, the error vector update represented by equation (5) and the final estimation output represented by equation (7) become, respectively:

$$E_p = H_p - W_{p,\Gamma^n}(W_{p,\Gamma^n}^H C_p W_{p,\Gamma^n} + \sigma^2 I)^{-1} W_{p,\Gamma^n}^H C_p H_p \quad (15)$$

$$\hat{H}_p = W_{\Gamma^n}(W_{p,\Gamma^n}^H C_p W_{p,\Gamma^n} + \sigma^2 I)^{-1} W_{p,\Gamma^n}^H C_p H_p \quad (16)$$

The overall iterative procedure described herein can be combined with any of these implementation variations.

The inclusion parameter $T_{max}$ previously identified determines the maximum number of delay taps to be estimated using the iterative algorithm described herein. In general, the number of taps that can be reliably estimated is determined by the dimension of the estimation problem, $L_{max}$, and the number of samples, $S_{max}$. For a higher problem dimension $L_{max}$, the inclusion parameter $T_{max}$ should be set smaller. With more samples, the inclusion parameter $T_{max}$ can be set higher. The setting for $T_{max}$ based on $L_{max}$ and $S_{max}$ can be stored as a look-up table or as a function as given by:

$$T_{max} = g(S_{max}, L_{max}) \quad (17)$$

$T_{max}$ generally scales linearly with $S_{max}$ and nonlinearly with $S_{max}/L_{max}$. From test results with various MIMO channel scenarios for the iterative algorithm described herein, scaling with $S_{max}/L_{max}$ is generally linear with weak second order effects. Hence, the setting of $T_{max}$ can be compactly stored as the following quadratic function:

$$T_{max} = S_{max} \times \left[ a \times \left( \frac{S_{max}}{L_{max}} \right)^2 + b \times \frac{S_{max}}{L_{max}} + c \right] \quad (18)$$

where a, b and c are three constants stored in the receiver CSI estimator.

By imposing knowledge of the time domain tap delay channel model structure, the methods described herein achieve better estimation accuracy for the same amount of available reference symbols or feedback samples. Based on iteratively applying ranking and simple least square estimation, the methods described herein arrive at high-fidelity estimates with significantly lower computational complexity.

The estimation methods described herein can be applied to CSI feedback samples, CSI-RS in the Rel/10 LTE systems, etc.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of estimating channel state information for a plurality of wireless channels linking a transmitter and a receiver, each channel corresponding to a different transmit-receive antenna pair, the method comprising:
   grouping the plurality of channels into one or more groups, each group including the channels associated with two or more collocated transmit and/or receive antennas;
   iteratively estimating a set of delay tap values in the time domain for each group of channels so that the channels included in the same group are associated with the same delay tap values;
   estimating a frequency domain channel response of each of the channels included in the same group of channels based on the set of delay tap values estimated for the group;
   determining a sparse vector of M total delay taps for the channels included in the same group;
   identifying N most dominant ones of the M total delay taps, where N<<M;
   calculating a delay tap value for each of the N most dominant delay taps, wherein the N most dominant delay taps correspond to the delay taps included in the sparse vector having the largest delay tap values;
   calculating a value of a first ranking metric for each of the M total delay taps included in the sparse vector during each iteration, the first metric being a function of delay tap frequency domain response and a measure of residual error; and
   identifying the delay taps included in the sparse vector having the largest first ranking metric values during the same iteration.

2. The method of claim 1, comprising combining the delay taps identified as having the largest first ranking metric values during a current iteration with the delay taps identified as having the largest first ranking metric values during a previous iteration to form a composite set of dominant delay taps.

3. The method of claim 2, comprising:
   calculating a time domain channel response estimate for each of the channels included in the same group as a function of the delay taps included in the composite set of dominant delay taps;
   calculating a value of a second ranking metric for each of the M total delay taps included in the sparse vector, the second metric being a function of the time domain channel response estimates;
   identifying the N most dominant ones of the M total delay taps having the largest second ranking metric values; and
   revising the measure of residual error as a function of the N most dominant delay taps.

4. The method of claim 3, comprising terminating the iterative process if the measure of residual error is revised by less than a predetermined amount, if the measure of residual error is less than a predetermined value or after a predetermined number of iterations.

5. The method of claim 3, comprising estimating the frequency domain channel response of each of the channels included in the same group of channels as a function of the N most dominant delay taps identified from the sparse vector of M total delay taps.

6. The method of claim 5, comprising sampling the channels included in the same group at a plurality of frequency sub-carriers to calculate the time domain and frequency domain channel response estimates.

7. A receiver linked to a transmitter via a plurality of wireless channels, each channel corresponding to a different transmit-receive antenna pair, the receiver comprising:
one or more receive antennas; and
a channel state information estimator operable to:
group the plurality of channels into one or more groups, each group including the channels associated with two or more collocated transmit and/or receive antennas;
iteratively estimate a set of delay tap values in the time domain for each group of channels so that the channels included in the same group are associated with the same delay tap values; and
estimate a frequency domain channel response of each of the channels included in the same group of channels based on the set of delay tap values estimated for the group, wherein the channel state information estimator is operable to set the delay tap values to zero for the delay taps included in the sparse vector not identified as the N most dominant delay taps;
wherein the channel state information estimator is operable to:
calculate a value of a first ranking metric for each of the M total delay taps included in the sparse vector during each iteration, the first metric being a function of delay tap frequency domain response and a measure of residual error; and
identify the delay taps included in the sparse vector having the largest first ranking metric values during the same iteration.

8. The receiver of claim 7, wherein the channel state information estimator is operable to combine the delay taps identified as having the largest first ranking metric values during a current iteration with the delay taps identified as having the largest first ranking metric values during a previous iteration to form a composite set of dominant delay taps.

9. The receiver of claim 8, wherein the channel state information estimator is operable to:
calculate a time domain channel response estimate for each of the channels included in the same group as a function of the delay taps included in the composite set of dominant delay taps;
calculate a value of a second ranking metric for each of the M total delay taps included in the sparse vector, the second metric being a function of the time domain channel response estimates;
identify the N most dominant ones of the M total delay taps having the largest second ranking metric values; and
revise the measure of residual error as a function of the N most dominant delay taps.

10. The receiver of claim 9, wherein the channel state information estimator is operable to terminate the iterative process if the measure of residual error is revised by less than a predetermined amount, if the measure of residual error is less than a predetermined value or after a predetermined number of iterations.

11. The receiver of claim 9, wherein the channel state information estimator is operable to estimate the frequency domain channel response of each of the channels included in the same group of channels as a function of the N most dominant delay taps identified from the sparse vector of M total delay taps.

12. The receiver of claim 11, wherein the channel state information estimator is operable to sample the channels included in the same group at a plurality of frequency sub-carriers to calculate the time domain and frequency domain channel response estimates.

* * * * *